United States Patent
Mathias et al.

(10) Patent No.: US 10,449,592 B2
(45) Date of Patent: Oct. 22, 2019

(54) METHOD FOR REMOVING A WORKPIECE PART AND MACHINE TOOL

(75) Inventors: Harald Mathias, Boenningheim (DE);
Jochen Bellon, Renningen (DE);
Martin Bechtold, Gemmrigheim (DE)

(73) Assignee: TRUMPF Werkzeugmaschinen GmbH + Co. KG, Ditzingen (DE)

( * ) Notice: Subject to any disclaimer, the term of this patent is extended or adjusted under 35 U.S.C. 154(b) by 696 days.

(21) Appl. No.: 14/417,953

(22) PCT Filed: Aug. 6, 2012

(86) PCT No.: PCT/EP2012/065326
§ 371 (c)(1),
(2), (4) Date: Jun. 25, 2015

(87) PCT Pub. No.: WO2014/023323
PCT Pub. Date: Feb. 13, 2014

(65) Prior Publication Data
US 2015/0306653 A1 Oct. 29, 2015

(51) Int. Cl.
*B21D 45/00* (2006.01)
*B23K 26/08* (2014.01)
(Continued)

(52) U.S. Cl.
CPC .......... *B21D 45/003* (2013.01); *B21D 28/10* (2013.01); *B21D 45/04* (2013.01); *B23K 26/083* (2013.01);
(Continued)

(58) Field of Classification Search
CPC ... Y10T 83/2079; Y10T 83/0457; B26D 7/18; B26D 7/1818; B26D 7/1827;
(Continued)

(56) References Cited

U.S. PATENT DOCUMENTS 5,092,829 A * 3/1992 Gerber .................. A41H 43/02
227/67
5,101,747 A * 4/1992 Gerber ................ B26D 7/1818
112/470.13
(Continued)

FOREIGN PATENT DOCUMENTS

DE  19616204 A1  1/1997
DE  20107571 U1  1/2002
(Continued)

OTHER PUBLICATIONS

International Search Report from PCT Application No. PCT/EP2012/065326, dated Nov. 2, 2012, 4 pages.

*Primary Examiner* — Evan H MacFarlane
(74) *Attorney, Agent, or Firm* — Fish & Richardson P.C.

(57) ABSTRACT

A method for removal of a workpiece part from a residual workpiece of a sheet-like workpiece includes detecting an interlocking of the workpiece part with the residual workpiece. The workpiece is fixed for machining by a holding device and movable in an X-Y plane of the workpiece. The workpiece part is formed by cutting machining on the workpiece resting on a workpiece support. Before or after the cutting, a gripper device is positioned in a removal position relative to the workpiece part, and the gripper device is activated and the workpiece part is gripped in its position resting on the workpiece support. The method includes initiating at least one release strategy for automatic workpiece removal. At least one travelling movement with at least one travel path of at least one of the holding device and the gripper device is activated with at least one movement component in the X-Y plane.

19 Claims, 5 Drawing Sheets

Figure 1:
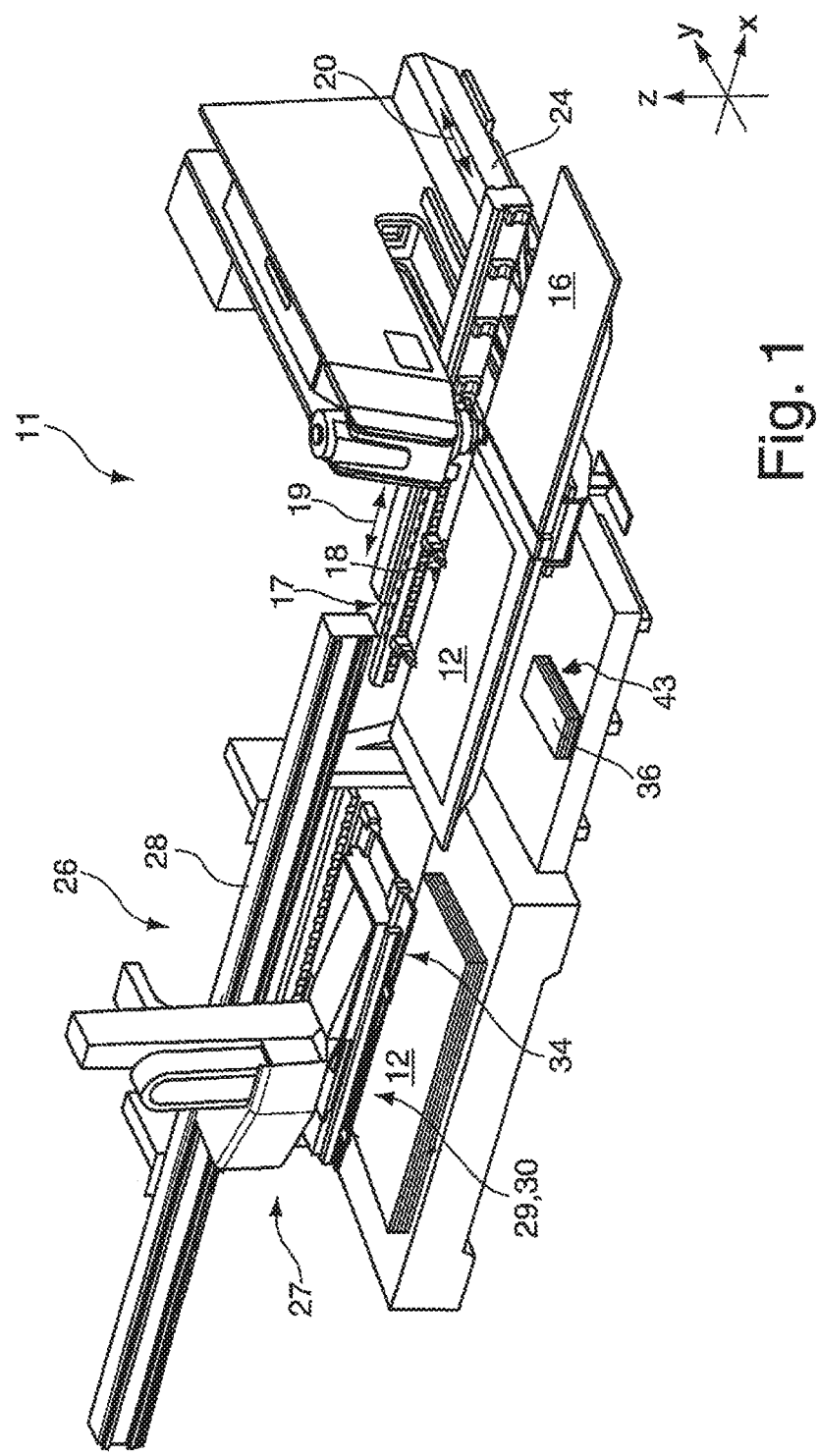

(51) Int. Cl.
*B21D 28/10* (2006.01)
*B21D 45/04* (2006.01)
*B23K 26/38* (2014.01)
*B23Q 7/04* (2006.01)
*B25J 9/00* (2006.01)

(52) U.S. Cl.
CPC .......... *B23K 26/0838* (2013.01); *B23K 26/38* (2013.01); *B23Q 7/046* (2013.01); *B25J 9/0096* (2013.01)

(58) Field of Classification Search
CPC .. B26D 7/1836; B26D 7/1845; B26D 7/1854; B26D 7/1863; B26D 2007/1809; B26D 2007/1872; B26D 2007/1881; B26D 2007/189; B21D 45/003; B21D 45/02; B21D 45/04; B21D 28/10; B23K 26/083; B23K 26/0838; B23K 26/0853; B23K 26/38; B65H 2601/11; B65H 2601/111; B65H 2601/10; B65H 2601/225; B65H 2601/51115; B65H 2601/273; B65H 2301/51115; B65H 7/06; B65H 7/14; B65H 29/54; B65H 29/56; B65H 43/02; B65H 43/04; B65H 43/08; B65H 2405/51; B65H 2405/55; B65H 2405/584; B65G 59/10; B65G 59/101; B65G 59/102; B65G 59/103; B65G 59/105; B65G 59/106; B23Q 7/046; B25J 9/0096

USPC .......................... 414/14–20, 222.01–226.05
See application file for complete search history.

(56) References Cited

U.S. PATENT DOCUMENTS

| | | | | |
|---|---|---|---|---|
| 5,884,542 | A * | 3/1999 | Gentile | B21C 51/00 192/127 |
| 5,889,675 | A * | 3/1999 | Minami | B25J 9/1612 198/434 |
| 6,055,895 | A * | 5/2000 | Kanazawa | B21D 43/18 414/752.1 |
| 7,131,361 | B2 * | 11/2006 | Nakajima | B23Q 7/04 83/100 |
| 9,008,841 | B2 * | 4/2015 | Fuhlbrigge | B25J 9/1687 700/253 |
| 2002/0185806 | A1 * | 12/2002 | Dettman | B21D 43/20 271/104 |
| 2004/0202531 | A1 * | 10/2004 | Beransky | B23K 26/083 414/331.18 |

FOREIGN PATENT DOCUMENTS

EP 0348311 A1 12/1989
EP 2177293 A1 * 4/2010 ............. B21D 45/02

* cited by examiner

METHOD FOR REMOVING A WORKPIECE PART AND MACHINE TOOL

The invention relates to a method for removing a workpiece part, formed by cutting machining on a sheet-like workpiece resting on a workpiece support of a machine tool from a residual workpiece, as well as a machine tool which comprises a workpiece support for supporting a sheet-like work piece, as well as a fixed machining device for cutting the workpiece into a workpiece part and a residual workpiece.

During the cutting machining, in particular during punching or (laser) cutting of sheet-like workpieces, workpiece parts are formed from the residual workpiece by free punching or free cutting. In this way, cut sections arise that typically have a width of less than 5 mm. To unload these workpiece parts, a handling device is used which grips the workpiece part and lifts it off and removes it from the residual workpiece. Due to the very small cut section and, potentially, by moving the residual workpiece with the free-punched or free-cut workpiece part on the workpiece support into a removal position, this can lead to the workpiece part being tilted or interlocked with the residual workpiece. During the automatic removal of such workpiece parts, it is checked by a removal monitoring device as to whether the workpiece part that is to be removed is interlocked with the residual workpiece. Should this be the case, a removal attempt is initiated by lowering the handling device and then gripping and subsequently lifting the workpiece part. If the interlocking is not released, this leads to the automatic removal process being interrupted and the machine tool to come to a standstill.

A method for an automatic removal of the workpiece part from the residual workpiece is proposed by EP 2 177 293 A1, wherein a lifting of the workpiece part that is to be removed on its underside is provided by means of at least one height-adjustable support element for passing at least one edge region of the workpiece tool into a removal position above the residual workpiece. Here, a suction frame of a handling device that is designed as a vacuum sucker is placed on the workpiece and is sucked through the suction frame. The workpiece is moved upwards jointly with a die and the suction frame, such that the workpiece part is arranged in a plane above the residual workpiece. In such a removal position, the workpiece part is lifted off above the suction frame and deposited in an unloading region.

The object of the invention is to provide a method for the removal of a workpiece part and to provide a machine tool, with which a reliable removal of workpiece parts from the residual workpiece is enabled in a simple manner.

This object is solved according to the invention by a method in which, when an interlocking of the workpiece part with the residual workpiece is detected by means of an unloading monitoring device, at least one release strategy for automatic workpiece removal is initiated, wherein at least one travelling movement of the holding device with the residual workpiece relative to the workpiece part, of the gripper device with the workpiece part relative to the residual workpiece, or of the holding device and the gripper device relative to each other, takes place along at least one predefined travel path that comprises at least one movement component in the X-Y plane. Interlocking between the workpiece part and the residual workpiece can thereby be mostly released, since the interlocking between the residual workpiece and the workpiece part often arises as a result of machining residues adhering thereto or as a result of a low level of burr formation. The interlocking can also arise due to dynamic tensions, such as thermal tensions, in the workpiece part, which are released after the final cut section between the workpiece part and the residual workpiece. Such interlocking may, however, also be caused when placing the handling device on the workpiece part.

A preferred embodiment of the method provides that the interlocking during the lifting off of the workpiece part from the residual workpiece is detected by a force sensor or by a release of the workpiece part from the gripper device, wherein the release of the workpiece part from the gripper device is preferably detected by means of the unloading monitoring device. With both exemplary embodiments, the interlocking of the workpiece part with the residual workpiece can be detected within process automation, in order to initiate a release strategy thereafter.

An alternative embodiment of the method provides that the interlocking is detected with the unloading monitoring device in a top view onto the workpiece part. Due to such an optical detection or scanning of the contour of the workpiece part that is to be released, interlocking may also be reliably detected.

A preferred embodiment of the method provides that the travelling movement of the holding device and/or gripper device is formed from at least one travel path that generates the predetermined course, said travel path being initiated from a starting point and terminating at an end point that is located in the starting point. Thus, a simple integration of this release strategy into the previous automatic unloading process can take place, which is initiated from a removal position, just as the release strategy.

An alternative embodiment to the automatic removal of workpiece parts provides that the travelling movement of the holding device and/or the gripper device is initiated at a starting point and is terminated at an end point that is separate from the starting point, preferably with a space that is smaller than the width of a cut section between the workpiece part and the residual workpiece. This alternative embodiment can, when there are interlockings that are difficult to release, be advantageous for achieving a release of the workpiece part from the residual workpiece and at the same time for positioning the workpiece part back in the cut free region in the residual workpiece for the subsequent removal.

A first variant of the travelling movement provides that a travel path is controlled between the starting point and the end point, said travel path having a circular or elliptical or arc-shaped progression. Thus, an at least slight and continuous relative movement between the workpiece and the residual workpiece can be achieved in each direction of the plane, in order to release the interlocking and then to enable an interlocking-free movement of the workpiece part into a free cut area in the residual workpiece.

A further variant of the travelling movement provides that the handling device and/or gripper device is controlled with at least one first travel path from a starting point to the at least one intermediate point, and at least one further travel path from the at least one intermediate point to the end point. Such a release strategy enables, in contrast to the aforementioned travelling movement with a continuous travelling movement within the travel path, an interruption between a first and the at least one second travel path, such that an exchange between the direction and/or speed relative to the first travel path is enabled. Further specific release strategies can thus be determined.

In one embodiment with a travelling movement from at least two travel paths separated by at least one intermediate point, provision is preferably made for the at least one first travel path to be controlled along a straight line or a circular path in an X-Y plane of the workpiece located on the workpiece support and for the at least one second travel path to be controlled along a circular path or a straight line. In this embodiment, in which, for example, the at least one travel path firstly takes place along a straight line, a simple release of the interlocking can be achieved, wherein, for the at least one second travel path after this along a circular path, it is enabled that the interlocking region between the workpiece part and the residual workpiece is, in particular, bypassed at its respective edges, such that a simple release of the workpiece part from the residual workpiece is provided.

A further alternative embodiment of the travelling movement provides that the at least one first travel path is controlled along a straight line in an X or Y direction, or in an X-Y plane of the workpiece support, and that the at least one second travel path is controlled to run counter to the first travel path. This release strategy represents a simple control of the holding device and/or gripper device, in which only one axis of the handling device and/or the workpiece support is controlled for movement back and forth. Alternatively, a control of two axes may also be provided, said axes forming an overlaying of the X and Y direction and thus generating a travelling movement in an X-Y plane.

A further alternative embodiment of the travelling movement provides that at least one first travel path of the holding device and/or gripper device is controlled with a circular path that deviates from the at least one second travel path of the holding device and/or gripper device. A further alternative release strategy can thereby be created.

A further preferred embodiment of the travelling movement of the holding device and/or gripper device provides that at least one first travel path runs along a spiral-shaped path. Thus, this can lead to a solution of the interlocking in the case of, for example, an idle residual workpiece, with the at least simple 360° rotation of the travel path when leaving the spiral-shaped path, in particular when there is an interlocked corner of the workpiece part with the residual workpiece. The same applies when there is an idle workpiece and a moved residual workpiece.

Furthermore, provision is preferably made for the travelling movement, which comprises at least one, preferably three, travel paths having at least one intermediate point, to comprise a further travel path that is controlled along a preferably closed circular path. Thus, due to a back-and-forth movement or a partial arc-shaped, circular or spiral-shaped travel path, an additional release movement can be applied downstream by travelling through a circular path, in particular a closed circular path, such that different travel paths can be combined with one another for one release strategy.

According to a further advantageous embodiment of the method, a further movement component is overlaid, at least in sections, over the travel movement, along a travelling direction in the Z direction. Due to the lifting of the workpiece part or the residual workpiece, which is only slight, a simple release of the interlocking can also be achieved, in particular if a corner region of the workpiece is located between the workpiece support and the residual workpiece.

The at least one travelling movement for the release strategy can also comprise a jerky movement back and forth or a jerky rotational movement of the holding device and/or gripper device. This jerky movement back and forth or rotational movement can take place in isolation or as a supplement to the travelling movements described above.

According to a further preferred embodiment of the method, provision can be made for a lifting or lowering movement of at least one structural component of the workpiece support or a structural component in the workpiece support to be overlaid over the at least one travelling movement. For example, a removal flap, in particular a laser removal flap, can be provided in the workpiece support, said flap being able to be lowered, such that a separation of the workpiece part from the residual workpiece is enabled.

A further preferred embodiment of the method provides that, while the release strategy is ongoing, a release of the interlocking between the workpiece part and the residual workpiece is monitored with the unloading monitoring device and, when the release of the interlocking is detected, the release strategy is terminated. This approach has the advantage that prematurely releasing interlockings are potentially detected before the release strategy has been completely passed through and the workpiece part can subsequently be removed directly, whereby a reduction in the procedural duration is enabled.

After the automatic workpiece part removal or the release strategy has been carried out, the position of the workpiece part in the residual workpiece is monitored with the unloading monitoring device and, when the additionally existing interlocking is detected, the release strategy is repeated at least once and, when the interlocking is present, the machine tool is stopped or, when the release of the interlocking is detected, the unloading procedure for the workpiece part is continued.

The object of the invention is furthermore solved by a machine tool, in which the holding device can be arranged with the residual workpiece and the workpiece part in a removal position in which the workpiece is able to be removed from the residual workpiece with the gripper device and, in this removal position, the holding device and/or gripper device are able to be moved, for a release strategy for automatic workpiece removal when the workpiece park is interlocked on the residual workpiece, with a travelling movement along at least one travel path having at least one movement component in the X-Y plane. Thus, a high level of flexibility is enabled in the travelling movement for the automatic removal position.

Figure 2:
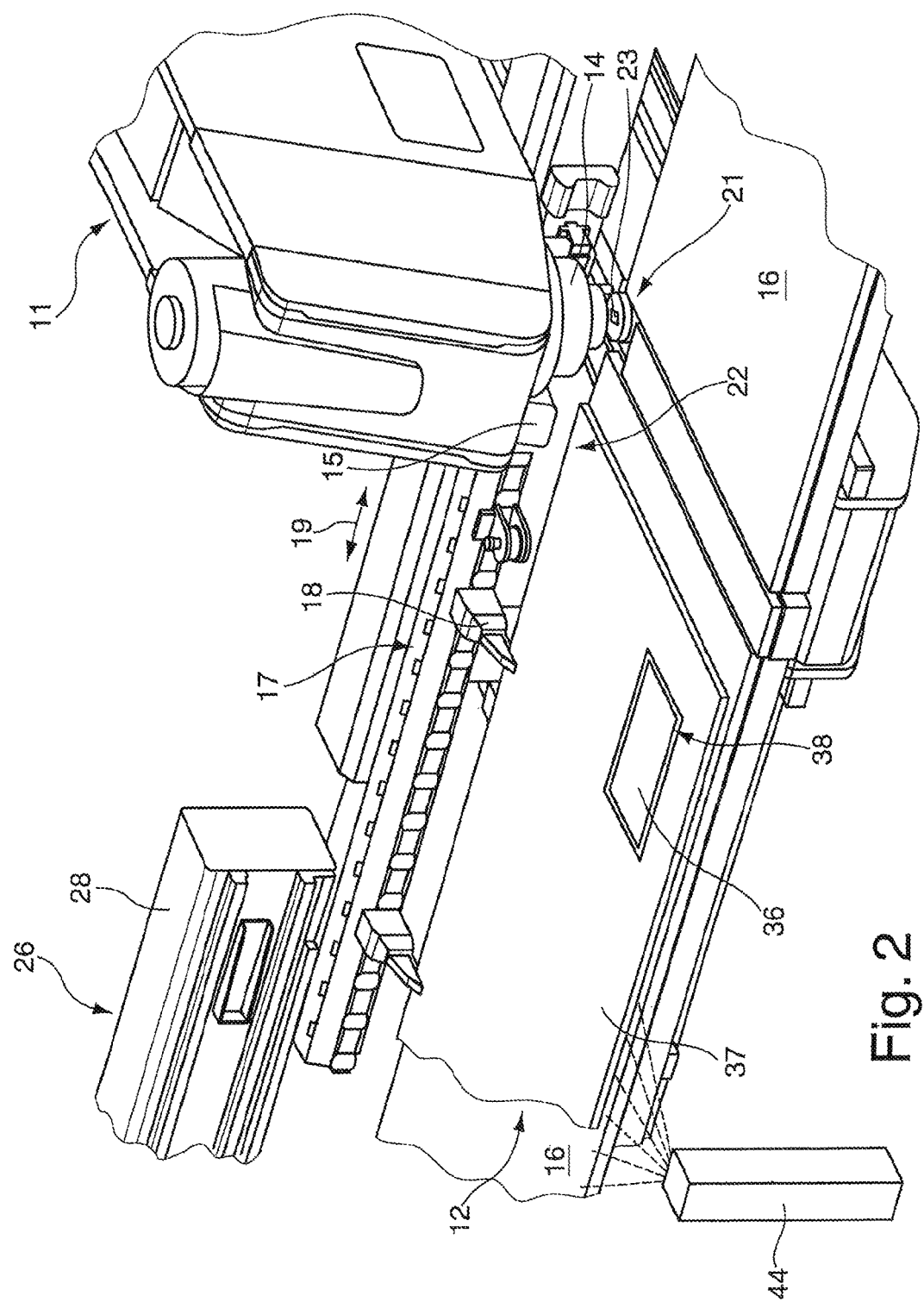
Figure 3:
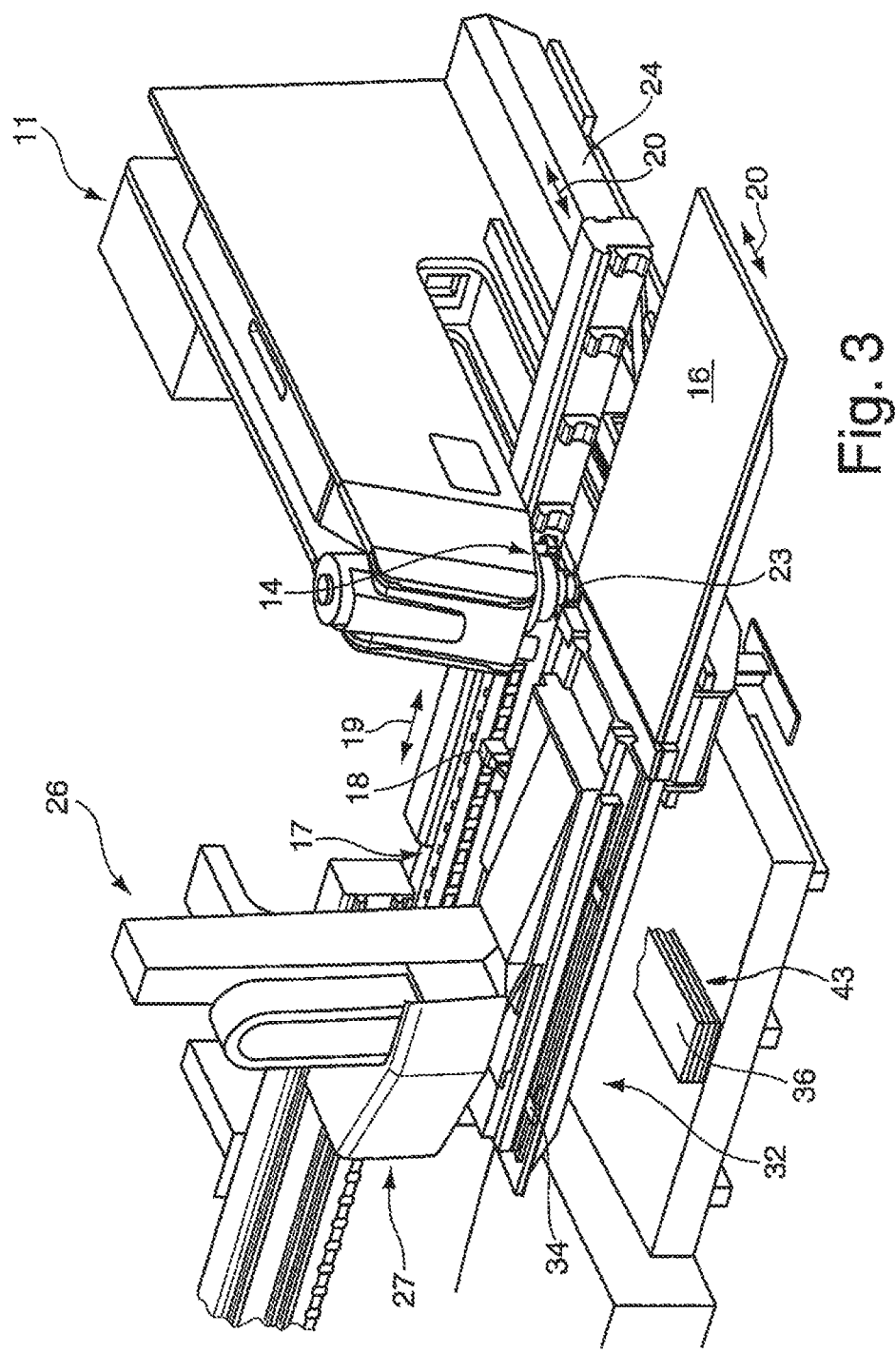
Figure 4A:
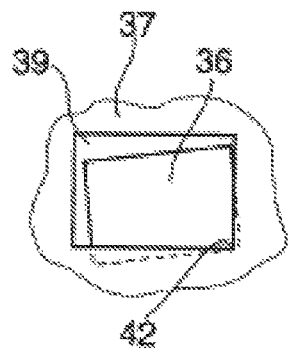
Figure 4B:
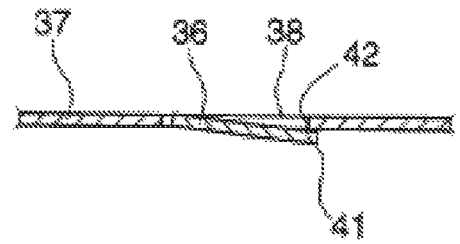
Figure 5A:
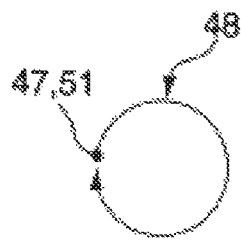
Figure 5B:
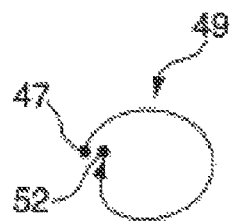
Figure 6A:
Figure 6B:
Figure 7A:
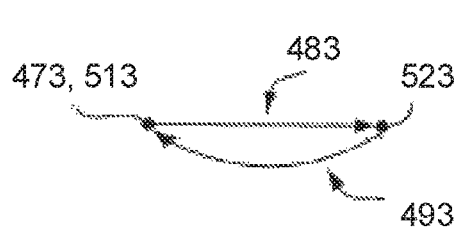
Figure 7B:
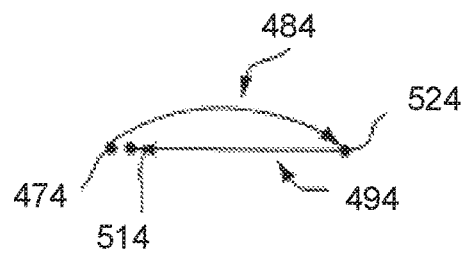
Figure 8:
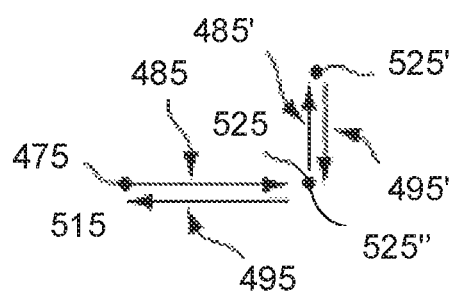
Figure 9:
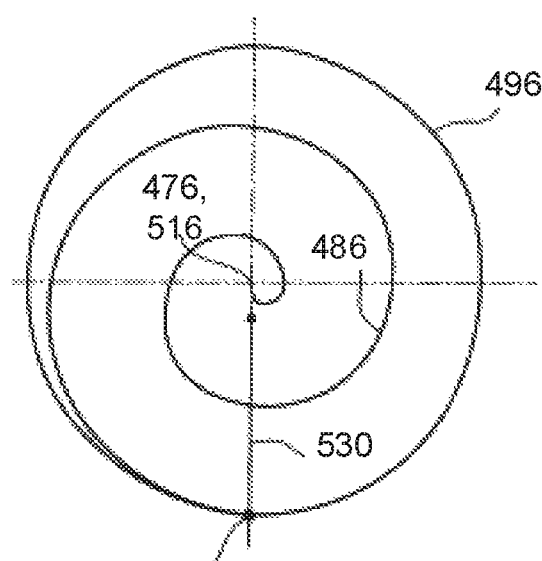
Figure 10:
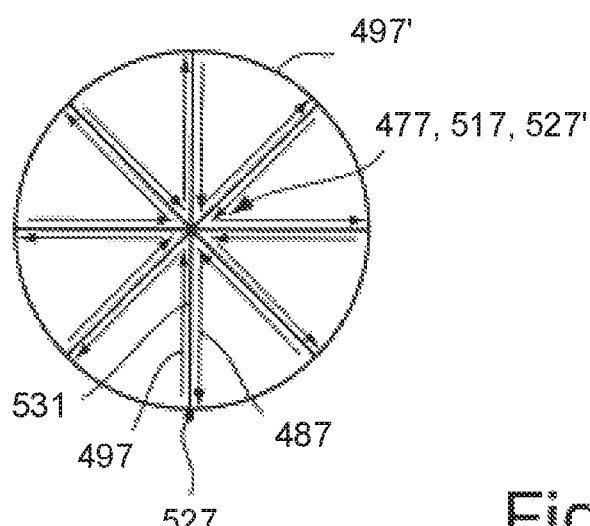

The invention and further advantageous embodiments and developments of the same are described and illustrated in greater detail below with the aid of the examples depicted in the drawings. The features that are to be gleaned from the description and the drawings may be applied according to the invention individually or as a multiplicity in any combination. Here are shown:

FIG. 1 a perspective view of a machine tool according to the invention,

FIG. 2 a schematically enlarged view of the machine tool according to FIG. 1, having a workpiece part in a residual workpiece, FIG. 3 a schematically enlarged view of the machine tool according to FIG. 1, having a handling device in a removal position, FIGS. 4a, 4b schematic depictions of an interlocked workpiece part with the residual workpiece, FIGS. 5a, 5b schematic depictions of a first alternative of a travelling movement of a release strategy, FIGS. 6a, 6b schematic depictions of a second alternative for a travelling movement, FIGS. 7a, 7b schematic depictions of a further alternative travelling movement, FIG. 8 a schematic depiction of a further alternative travelling movement, FIG. 9 a schematic depiction of a further alternative travelling movement, FIG. 10 a schematic depiction of a further alternative travelling movement, In FIG. 1, a machine tool 11 according to the invention is depicted perspectively, which is designed, for example, as a laser punching machine. For the cutting machining of a sheet-like workpiece 12, for example in the form of a sheet of metal, a punching head 14 having a punching stamp that is not depicted in greater a detail and a laser machining head 15 is provided. The workpiece 12 that is to be machined rests on a workpiece support 16 during the workpiece machining. While being machined, the workpiece 12 is held with a holding device 17, which preferably has clamps 18, and can be displaced relative to the punching head 14 and the laser machining head 15 in the X direction of the workpiece plane (X-Y plane) by means of a conventional linear drive 19 that is indicated by an arrow. The workpiece 12 can be moved in the Y direction of the workpiece plane by the workpiece support 16, together with the holding device 17, being moved relative to a base 24 on which the workpiece support 16 is mounted, by means of a conventional linear drive 20 that is indicated by an arrow.

The workpiece 12 can be moved in this way in the X and Y direction relative to the punching head 14 and the laser machine head 15, such that each region of the workpiece 12 that is to be machined is able to be positioned in a fixed machining region 21 of the punching head 14 or in a fixed machining region 22 of the laser machining head 15. The machining regions 21, 22 may lie in the same region of the workpiece support 16, wherein, due to a shifting movement of the workpiece support 16 relative to the base 24, the respective machining region 21 or 22 may be occupied.

A preferably exchangeable punching matrix 23 (FIG. 2) is positioned in the machining region 21 of the punching head 14. Accordingly, a laser matrix that is not depicted in greater detail is arranged in the fixed machining region 22 of the laser machining head 15.

A handling device 26 is allocated to the workpiece support 16 of the machine tool 11 on a front side, said handling device comprising a gripper device 27 that is able to be moved along at least one linear axis 28 of a loading and unloading position 29, 30 into a removal position in a removal region 32 (FIG. 3). In the removal region 32, each of the handling device 26 and the holding device 17 has its respective removal position. The gripper device 27 can, for example, be designed as a magnetic sucker, vacuum sucker, electroadhesion sucker or as a mechanical gripper. In the exemplary embodiment, a vacuum sucker is schematically depicted, which comprises a suction frame 34 having several suckers arranged thereon. The suction frame 34 and/or the individual suckers may additionally be driven moveably, at least in a further axis, along the X-Y-Z coordinate system with at least one linear drive.

A schematically enlarged view of one part of the machine tool 11 according to FIG. 1 is depicted in FIG. 2. The workpiece 12 rests on the workpiece support 16, wherein, due to the cutting machining of the workpiece 12 by a cut, a workpiece part 36 in a residual workpiece 37 is cut free. The residual workpiece 37 having the workpiece part 36 remaining in a cut-free area 38 is able to move from the machining region 21, 22 into the removal region 32 by means of the holding device 17. For the automatic removal of the workpiece part 36 from the residual workpiece 37, the gripper device 27 is positioned in its removal position in this removal region 32, as arises from FIG. 3. The suction frame 34 is lowered, such that, after the gripping of the workpiece part 36, this is raised and the workpiece part 36 comes free from the residual workpiece 37 in order to subsequently transfer the workpiece part 36 along the linear axis 28 into the unloading position 30 by a travelling movement of the gripper device 27 and to drop the workpiece part 36 on a stack 43 or pile.

During or after the cutting free or punching free of the workpiece part 36 from the residual workpiece 37, there may be an interlocking of the workpiece part 36 with the residual workpiece 37. In FIGS. 4a and b, such an interlocking is depicted by way of example. A corner region 41 of the workpiece part 36 lies underneath a corner region 42 of the residual workpiece 37, for example, such that, when removing the workpiece part 36, which so far has taken place by lifting the workpiece part 36 in the Z direction, a release of the workpiece part 36 from the residual workpiece 37 is impossible.

During an automatic removal process, before the removal of the workpiece part 36 from the residual workpiece 37, it is preferably checked by means of an unloading monitoring device 44 as to whether an interlocking of the workpiece part 36 with the residual workpiece 37 is present. If no interlocking is determined, the removal process takes place. If an interlocking exists between the workpiece part 36 and the residual workpiece 37, a release strategy is started in order to release the interlocking.

The unloading monitoring device 44 can, for example, as is depicted in FIG. 2, be designed as an optical monitoring device which optically scans the workpiece support 16 and the workpiece 12 lying thereon and the residual workpiece 37 and the workpiece part 36, preferably by means of a light array. It can thereby be detected, in particular by raising a workpiece part 36 by means of the gripper device 27, whether the workpiece part 36 is released from the gripper device 27. If this is the case, this can be based on interlocking, such that, following this, the release strategy can be started. The unloading monitoring device 44 may consist of several components. In addition, further, non-optical detection sensors may also be used. This unloading monitoring device 44 may also operate with oversight of the workpiece support 16. This is dependent on the concept of the machine tool 11 and the linear axes thereof, as well as the positioning of the punching head 14 and/or laser machining head 15 with respect to the workpiece support 16.

In FIGS. 5a to 10 below, different release strategies are depicted, each of which may be considered in of themselves or may also be designed in combination with and/or overlapping one another.

In FIG. 5a, a first release strategy is depicted. The starting point for this release strategy is the starting point 47. The starting point 47 corresponds to the arrangement depicted in FIG. 3, wherein the holding device 17 and the handling device 26 having the gripper device 27 are arranged in the removal region 32 and the gripper device 27 engages with the workpiece part 36, wherein the residual workpiece 37 is gripped by the holding device 17 and rests on the workpiece support 16. This starting situation also applies for the further described release strategies.

Based on this starting point 47, the holding device 17 is, for example, moved along a travel path 48 with movement components in the X and Y plane, said plane ending in an end point 51 which, according to the embodiment in FIG. 5a, is congruent with the starting point 47. The travel path 48 thus describes a circular path. Alternatively to this circular path, further curved progressions or travel paths that are similar to circular paths may be provided, which lie between the starting point 47 and the end point 51.

For this release strategy, the workpiece part 36 is held in place according to a first embodiment. Provision may alternatively be made for the residual workpiece 37 to be held in place by the holding device 17 relative to the workpiece support 16 and for the gripper 27 to pass through the travel path 48. Alternatively, the holding device 17 and the gripper device 27 may also be moved, such that this travel path 48 is produced.

An alternative embodiment to FIG. 5a for the release strategy is depicted in FIG. 5b. The starting point 47 corresponds to that in FIG. 5a. An end point 52 is not congruent to the starting point 47, but rather the end point 52 lies adjacent to the starting point 47. Therefore, a travel path 49 results apart from that, the embodiments and variants of FIG. 5a apply.

A further alternative release strategy is depicted in FIG. 6a. This comprises, for example, first and second travel paths 481, 491 that deviate from each other. Originating from a starting point 471, the holding device 17 is, for example, moved along the first travel path 481 towards an intermediate point 521. From this intermediate point 521, the second travel path 491 is controlled, which leads to an end point 511 which is in turn congruent with the starting point 471. The travel paths 481, 491 are in contrary directions and may be the same with respect to the speed and/or the travel route.

FIG. 6b differs from FIG. 6a only to the effect that the end point 512 lies adjacent to the starting point 472. First travel paths 482 and 492 correspond to the first travel paths 481 and 492 in FIG. 6a, respectively. An intermediate point 522 corresponds to the intermediate point 521 in FIG. 6a.

As depicted in FIGS. 6a and 6b, the travel paths 481, 491 and 482, 492 are designed to be slightly arch-like. These may also take place along a straight line, such that, for example, the travel path 481, 491, 482, or 492 only has one movement component along one axis, so the X or Y axis, for movement back and forth. Alternatively, the travel paths may also have an overlay of the X-Y direction. Furthermore, a travel path may also have a movement component in the X or Y direction and a movement component in the Z direction, such that a release strategy is activated with a travel direction in an X-Z plane or a Y-Z plane.

Alternative embodiments to FIGS. 6a and 6b are depicted in FIGS. 7a and 7b. The release strategy according to FIG. 7a deviates from the one in FIG. 6a to the extent that the first and second travel paths 483, 493 deviate from each other with respect to the travel route and/or the travelling speed. The first travel path 483 starting from the starting point 473 to the intermediate point 523 is straight-like, while the second travel path 493 starting from the intermediate point 524 to the end point 513 is arc-like. The end point 513 is in turn congruent with the starting point 473. The same applies for FIG. 7b compared to FIG. 6b. The first travel path 484 starting from the starting point 474 to the intermediate point 524 is arc-like, while the second travel path 494 starting from the intermediate point 524 to the an end point 514 is arc-like. The end point 514 lies adjacent to the starting point 474.

A further alternative embodiment for a release strategy is depicted in FIG. 8. Here, a type of L-shaped release strategy can be implemented. Originating from the start point 475, the holding device 17 or the gripper device 27 is moved along a first axis up to the first intermediate point 525, and there then takes place a second travel path 485' up to a second intermediate point 525', which deviates from the first travel path 485 in terms of length and direction. A change of direction then occurs, where, in particular, the third travel path 495' only runs in the opposite direction to the second travel path 485' until the holding device 17 arrives at a third intermediate point 525". Then the fourth travel path 495 up to the end point 515 is activated, which only corresponds to a change in direction of the first travel path 485. The end point 515 may lie in the start point 475 or adjacent thereto. Alternatively, the holding device 17 and the gripper device 27 may also be activated at the same time.

In this embodiment, provision can also be made for the travelling movements to be divided into the holding device 17 and the gripper device 27. For example, the holding device 17 may pass through the first and fourth travel paths 485 and 495, whereas the gripper device 27 passes through the second and third travel paths 485' and 495'. Mixing these up is also possible. Likewise, the sequence may be different. Moreover, a deviating course along a rectangle or triangle can, for example, be run on.

Furthermore, only a first travel path 485 from a start point 475 to an intermediate point 525, which then forms an end point 515, may alternatively be provided. Likewise, a first travel path 485 and second travel path 485' may be carried out from the starting point 475, such that, for example, the end point 515 lies in the second intermediate point 525' depicted in FIG. 8. The travel paths are only passed through in one direction. It is also not necessary for movement back and forth of the travel paths to be required, but rather one or more travel paths that only occur in one direction and are linked to each other may also be passed through.

A further alternative release strategy is depicted in FIG. 9. Originating from the starting point 476, a spiral-shaped travel path 486 is activated, where the travel path 486 may have one or more spiral windings. These spiral windings may be passed through in both the anticlockwise and clockwise direction. After the spiral-shaped travel path 486 has been passed through and the intermediate point 526 has been reached, a second travel path 496 is activated, which corresponds to an arc, such that the end of the second travel path 496 in turn lies in the intermediate point 526. From here, a third travel path 530 is activated, which leads to the end point 516, which, for example, is located in the starting point 476. It is understood that this release strategy is in turn driven by the holding device 17 and/or gripper device 27.

A further alternative release strategy is depicted in FIG. 10. Originating from a central starting point 477, a first travel path 487 is firstly passed through radially outwards towards an intermediate point 527 along a straight line. Then, in the opposite direction, a second travel path 497 is activated, where the second intermediate point 527' lies in the starting point 477. Subsequently to this, both travel paths are repeated once or several times, such that a star-shaped arrangement of the travel paths arises. At the end of the star-shaped travel paths, a closed arc 497' is in turn passed through, analogously to FIG. 9, in order to return to the end point 517 with a final travel path 531, said end point preferably corresponding to the starting point 477.

The release strategies described above include travel paths which lie in the X-Y plane of the workpiece 12. In addition, an overlaying of the travel path in the Z direction may be provided. Moreover, a jerking movement may additionally be overlaid at the beginning, during or at the end of one or more travel paths, in order to achieve the release of an interlocking.

The invention claimed is:

1. A method for removal of a workpiece part from a residual workpiece of a workpiece, the method comprising:
   detecting, by an unloading monitoring device, an interlocking of the workpiece part with the residual workpiece, wherein the workpiece is fixed by a holding device on a workpiece support of a machine tool for machining and moveable along at least one of an X or Y direction in an X-Y plane of the workpiece, wherein the workpiece part is formed by cutting machining on the workpiece resting on the workpiece support of the machine tool, wherein, before or after the cutting machining of the workpiece part from the residual workpiece, a handling device having a gripper device is positioned in a removal position relative to the workpiece part, and wherein the gripper device is activated and the workpiece part is gripped in its position resting on the workpiece support; and in response to the detecting the interlocking of the workpiece part with the residual workpiece, initiating at least one release strategy for automatic workpiece removal of the workpiece part resting on the workpiece support and gripped by the gripper device from the residual workpiece fixed on the workpiece support by the holding device by moving at least one of the holding device or the gripper device, during which at least one travelling movement in the X-Y plane with at least one travel path of the holding device, the gripper device, or the holding device and the gripper device relative to each other is activated with at least one movement component in the X-Y plane.

2. The method of claim 1, wherein the interlocking of the workpiece part with the residual workpiece when withdrawing the workpiece part from the residual workpiece is detected by a force sensor or by a release of the workpiece part from the gripper device.

3. The method of claim 2, wherein the release of the workpiece part from the gripper device is detected by the unloading monitoring device.

4. The method of claim 1, wherein detecting the interlocking of the workpiece part with the residual workpiece comprises:
optically detecting the interlocking of the workpiece part with the residual workpiece under supervision of the workpiece part with the unloading monitoring device.

5. The method of claim 1, wherein the travelling movement of at least one of the holding device or the gripper device is formed with the at least one travel path that starts from a starting point and ends in an end point, and
wherein the end point lies in the start point or separately from the starting point.

6. The method of claim 5, wherein the end point lies separately from the starting point at a distance that is smaller than a width of a cut section between the workpiece part and the residual workpiece.

7. The method of claim 5, wherein the travelling movement with the at least one travel path of the at least one of the holding device or the gripper device is activated between the starting point and the end point with a circular or elliptical or arc-shaped course.

8. The method of claim 5,
wherein the travelling movement of the at least one of the holding device or the gripper device is activated with at least one first travel path from the starting point to at least one intermediate point and with at least one second travel path from the at least one intermediate point to the end point, and
wherein the at least one first travel path and the at least one second travel path are configured to be one of:
the at least one first travel path being activated along a straight line or an arc in the X-Y plane of the workpiece and the at least second travel path being activated along an arc or a straight line, the at least one first travel path being activated along a straight line in the X or Y direction or in the X-Y plane of the workpiece and the at least one second travel path being activated in an opposite direction to the at least one first travel path, and
the at least one first travel path being activated with a circular path that deviates from the at least one second travel path.

9. The method of claim 1, wherein the at least one travel path is activated along a spiral-shaped course.

10. The method of claim 1, wherein the travelling movement of at least one of the holding device or the gripper device comprises at least three travel paths having at least two intermediate points, and wherein one of the travel paths is activated in an arc.

11. The method of claim 10, wherein the one of the travel paths is activated in a closed loop.

12. The method of claim 1, wherein the travelling movement of at least one of the holding device or the gripper device is overlaid, at least in sections, with a movement component along a travelling direction in a Z axis.

13. The method of claim 1, wherein the travelling movement with the at least one travel path has a movement back and forth or a rotational movement, or is overlaid by a movement back and forth or a rotational movement.

14. The method of claim 1, wherein the travelling movement of at least one of the holding device or the gripper device with the at least one travel path is overlaid by a lifting or lowering movement of at least one structural component of the workpiece support.

15. The method of claim 1, further comprising:
monitoring, with the unloading monitoring device, a freeing of the interlocking during running of the release strategy for automatic workpiece removal;
detecting the freeing of the workpiece part from the residual workpiece; then after the detecting, ending the release strategy.

16. The method of claim 1, further comprising:
after the release strategy has ended, checking the position of the workpiece part in the residual workpiece with the unloading monitoring device; and
determining whether there is a further interlocking or whether the interlocking exists.

17. The method of claim 16, further comprising one of
in response to determining that there is a further interlocking, repeating the release strategy at least once;
in response to determining that the interlocking exists, stopping the machine tool; and
in response to determining that the interlocking is released, continuing unloading the workpiece part.

18. The method of claim 1, wherein the workpiece comprises a sheet of metal.

19. A machine tool for cutting machining of a workpiece, comprising:
a workpiece support for receiving the workpiece;
a machining device for dividing the workpiece into a workpiece part and a residual workpiece, the machining device comprising:
a holding device, with which the workpiece is fixed and movable at least in an X or Y direction in an X-Y plane of the workpiece resting on the workpiece support; and
a handling device having a gripper device for unloading the workpiece part; and
an unloading monitoring device for detecting an interlocking of the workpiece part with the residual workpiece, wherein the holding device is arranged with the residual workpiece and the workpiece part in a removal position, in which the workpiece part resting on the workpiece support and grasped by the gripper device is able to be removed from the residual workpiece fixed on the workpiece support by the holding device, and wherein, in the removal position, at least one of the holding device or the gripper device is configured to be moved for a release strategy with a travelling movement in the X-Y plane along at least one travel path with at least one movement component in the X-Y plane, the release strategy being initiated for automatic workpiece removal of the workpiece part from the residual workpiece in response to detecting that there is the interlocking of the workpiece part with the residual workpiece.

* * * * *